United States Patent [19] | [11] 4,434,428
Horike et al. | [45] Feb. 28, 1984

[54] DEFLECTION DETECTOR FOR INK JET PRINTING APPARATUS

[75] Inventors: Masanori Horike; Yutaka Ebi, both of Tokyo, Japan

[73] Assignee: Ricoh Company, Ltd., Tokyo, Japan

[21] Appl. No.: 384,133

[22] Filed: Jun. 1, 1982

[30] Foreign Application Priority Data

Jun. 8, 1981 [JP] Japan ................................ 56-87955

[51] Int. Cl.³ ...................... G01D 15/18; G01D 18/00
[52] U.S. Cl. ................................ 346/75; 346/140 R
[58] Field of Search ................................ 346/75, 140

[56] References Cited

U.S. PATENT DOCUMENTS

| | | | |
|---|---|---|---|
| 3,852,768 | 12/1974 | Carmichael et al. | 346/75 |
| 3,886,564 | 5/1975 | Naylor et al. | 346/75 |
| 3,898,673 | 8/1975 | Haskell | 346/75 X |
| 4,067,019 | 1/1978 | Fleischer et al. | 346/75 |
| 4,136,345 | 1/1979 | Neville et al. | 346/75 |
| 4,281,332 | 7/1981 | Horike | 346/75 |
| 4,286,273 | 8/1981 | Horike | 346/75 |
| 4,310,846 | 1/1982 | Horike | 346/75 |
| 4,364,061 | 12/1982 | Horike et al. | 346/75 |
| 4,370,664 | 1/1983 | Horike et al. | 346/75 |
| 4,395,717 | 7/1983 | Horike et al. | 346/75 |

*Primary Examiner*—George H. Miller, Jr.
*Attorney, Agent, or Firm*—David G. Alexander

[57] ABSTRACT

A deflection detector for an ink jet printer comprises first and second plates made of an insulating material and bonded to each other. The first insulator plate is provided with at least two separate detection electrodes on its one surface and a shield electrode at its other surface, while the second insulator plate is provided with a shield plate on its one surface and bonded to the first plate at the other surface. The first and second plates are formed with aligned slots which also extend throughout the electrodes to pass ink droplets therethrough. The thickness of each detection electrodes corresponds to an interval between successive ink droplets. The deflection detector is positioned such that the plate containing the detection electrodes is substantially perpendicular to a specific reference path for deflection.

10 Claims, 15 Drawing Figures

DEFLECTION DETECTOR FOR INK JET PRINTING APPARATUS

BACKGROUND OF THE INVENTION

The present invention generally relates to deflection control type ink jet printing apparatuses and, more particularly, to a deflection detector for discriminating proper and inproper deflections and/or amounts of deflection of charged ink droplets.

In an ink jet printer of the type described, an ink is ejected under supersonic vibration from a nozzle and then separated into droplets at regular intervals at a position advanced a predetermined distance from the nozzle. Timed to the separation of ink droplets, a charging electrode selectively applies a charging electric field to the ink droplets to deposit electrostatic charges thereon. Thereafter, deflection electrodes deflect charged ink droplet passing therebetween in accordance with their charges, so that the ink droplets impinge on a sheet of paper to print out desired data.

Deflection of charged ink droplets depend on the ink pressure, ink temperature, amplitude of the supersonic vibration, a charging timing, a charging voltage, a deflecting voltage and other various factors, which obstructs easy setting of the deflections. A widespread practice is detecting a deflection of charged ink droplets and controlling the pressure or temperature of ink and the charging voltage as well as the others until the actual deflection coincides with predetermined one. In one of various deflection detecting methods heretofore proposed, a pair of spaced charge detecting electrodes are arranged adjacent to a predetermined deflection path or reference path with the center of their spacing registered with the reference path, as disclosed in Japanese Patent no. 52-47284/1977 and "IBM Journal", January 1977, pp. 52–55. Potentials induced in the electrodes are coupled to a differential amplifier so that a deflection position can be determined depending on the polarity and level of the output signal of the differential amplifier.

Another known method of similar type is designed for a higher accuracy of detection which precludes errors due to noise, as described in Japanese Patent Application no. 55-153558/1980. In this method, a charge pattern consists of a string of "m (integer)" successive ink droplets charged to one polarity and a string of "n (integer)" successive ink droplets charged to the other polarity or non-charged occurring in an alternate order. The output potentials of the two electrodes are individually rectified and coupled to a differential amplifier whose output is discriminated as two electric signals of different polarities. When a first electric signal is high or logical "1" level and a second is low or logical "0" level, ink droplets are determined to have moved along a path above the reference path (excessive deflection). When the first signal is low or logical "0" level and the second high or logical "1" level, the actual path of ink droplets is determined to be below the reference path (short deflection). If both the signals are low or logical "0" level, the actual path is identified with the reference path.

However, a problem has existed in these prior art deflection detecting methods in that a distance ink droplets are expected to fly must be increased to accommodate the detection electrodes which are arranged along the path of ink droplets. Another problem is that a substantial period of time is required to detect a deflection position in order to enhance the stability in detection.

SUMMARY OF THE INVENTION

In one aspect of the present invention, a deflection detector for an ink jet printing apparatus is provided which comprises a first layer of an insulating material which carries on one surface thereof at least two flat and thin separate detection electrodes, and a second layer of an insulating material which is engaged with the detection electrodes at one surface thereof. The first and second insulator layers are formed with aligned slots which extend throughout the insulator layers and the detection electrodes to allow ink droplets to pass therethrough.

In another aspect of the present invention, an ink jet printing apparatus is provided which includes an ink ejection head for ejecting a jet of ink, charging means for electrostatically and selectively charging ink droplets successively separated from the jet of ink, and deflection means for electrostatically deflecting the charged ink droplets. An amount of deflection of the charged ink droplets is detected by a deflection detector which has a first layer of an insulating material which carries on one surface thereof at least two flat and thin separate detection electrodes, and a second layer of an insulating material which is engaged with the detection electrodes at one surface thereof. The first and second insulator layers are formed with aligned slots which extend throughout the insulator layers and the detection electrodes to allow ink droplets to pass therethrough.

In accordance with the present invention, a deflection detector for an ink jet printing apparatus comprises first and second plates made of an insulating material and bonded to each other. The first insulator plate is provided with at least two separate detection electrodes on its one surface and a shield electrode at the other surface, while the second insulator plate is provided with a shield plate on its one surface and bonded to the first plate at the other surface. The first and second plates are formed with aligned slots which also extend throughout the electrodes to pass ink droplets therethrough. The thickness of the detection electrodes corresponds to an interval between successive ink droplets. The deflection detector is positioned such that the plane containing the detection electrodes is substantially perpendicular to a specific reference path for detection.

It is accordingly an object of the present invention to provide a deflection detector for an ink jet printing apparatus which is capable of detecting a proper amount of deflection of ink droplets.

It is another object of the present invention to provide a deflection detector for an ink jet printing apparatus which shortens a predetermined distance for the movement of ink droplets thereby promoting quick detection of a deflection position within a short period of time.

It is another object of the present invention to provide a deflection detector for an ink jet printing apparatus which can operate to an excellent accuracy.

It is another object of the present invention to provide a deflection detector for an ink jet printing apparatus which is reliable in operation, provides high quality printing and economical to manufacture on a commercial production basis.

It is another object of the present invention to provide a generally improved deflection detector for an ink jet printing apparatus.

Other objects, together with the foregoing are attained in the embodiments described in the following description and illustrated in the accompanying drawings.

DESCRIPTION OF THE PREFERRED EMBODIMENT

While the deflection detector for an ink jet printing apparatus of the present invention is susceptible of numerous physical embodiments, depending upon the environment and requirements of use, substantial numbers of the herein shown and described embodiment have been made, tested and used, and all have performed in an eminently satisfactory manner.

Figure 1:
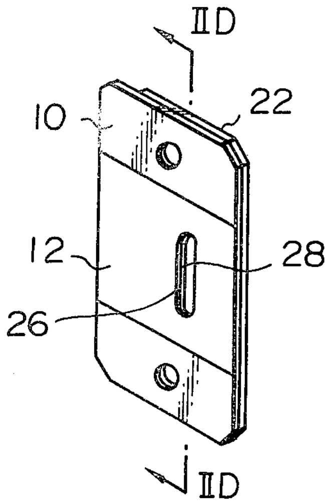
FIG. 1 is a perspective view of a deflection detector embodying the present invention.
Figure 2A:
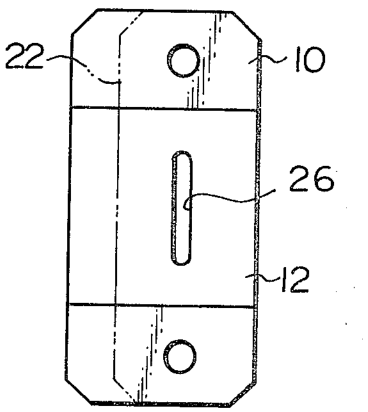
FIG. 2*a* is an enlarged plan view of the deflection detector.
Figure 2B:
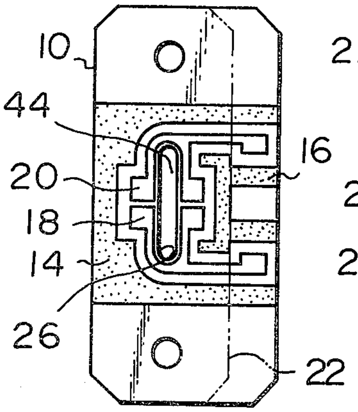
FIG. 2*b* is a view similar to FIG. 2*a* but showing a surface opposite to that of FIG. 2*a;*

Referring to FIG. 1 of the drawings, the deflection detector includes a first plate 10 made of an insulating material. Preferably, the insulator plate 10 is in the form of an about 0.8 mm thick sheet of glass epoxy resin which ensures a desirable dimensional accuracy and avoids deformation. A shield electrode 12 is deposited on one surface of the insulator plate 10 as shown in FIG. 2*a*. Carried on the other surface of the insulator plate 10 are, as shown in FIG. 2*b*, two shield electrodes 14 and 16 and two charge detecting electrodes 18 and 20. These electrodes are formed by plating 18 $\mu$m thick printed electrodes of copper with nickel to a thickness of 3 $\mu$m, thus having a total thickness of 21 $\mu$m. The electrodes 18, 20 are arranged to form a generally U-shape and at a minute spacing of 0.5 mm as seen in FIG. 2*b*.

Figure 2C:
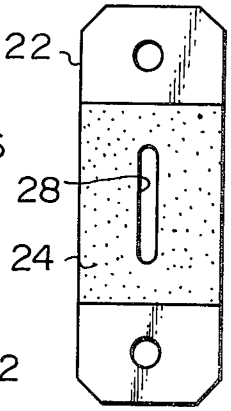
FIG. 2*c* is an enlarged plan view of an insulator plate of the deflection detector.
Figure 2D:
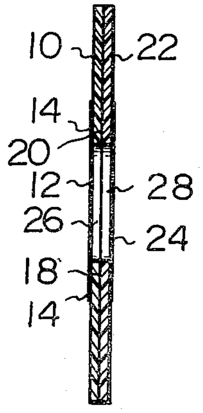
FIG. 2*d* is a section along line IID–IID of FIG. 1.

A second plate 22 made of an insulating material is bonded to that surface of the first plate 10 which carries the electrodes 18 and 20 thereon. The insulator plate 22 is preferably formed of glass epoxy resin to a thickness of about 0.8 mm as the insulator plate 10. Deposited on the bonding surface of the insulator plate 22 is a shield electrodes 24 as shown in FIG. 2*c*. The insulator plate 22 is shaped narrower than the insulator plate 10 so that end portions of the electrodes 14, 16, 18 and 20 on the insulator plate 10 are exposed to the outside for their connection with leads in the assembled condition shown in FIG. 1.

The insulator plates 10 and 22 are formed with aligned slots 26 and 28 for the passage of ink droplets, respectively. These slots 26 and 28 extend throughout the shield electrodes 12 and 24 and spans the opposite electrodes 18 and 20.

Figure 3A:
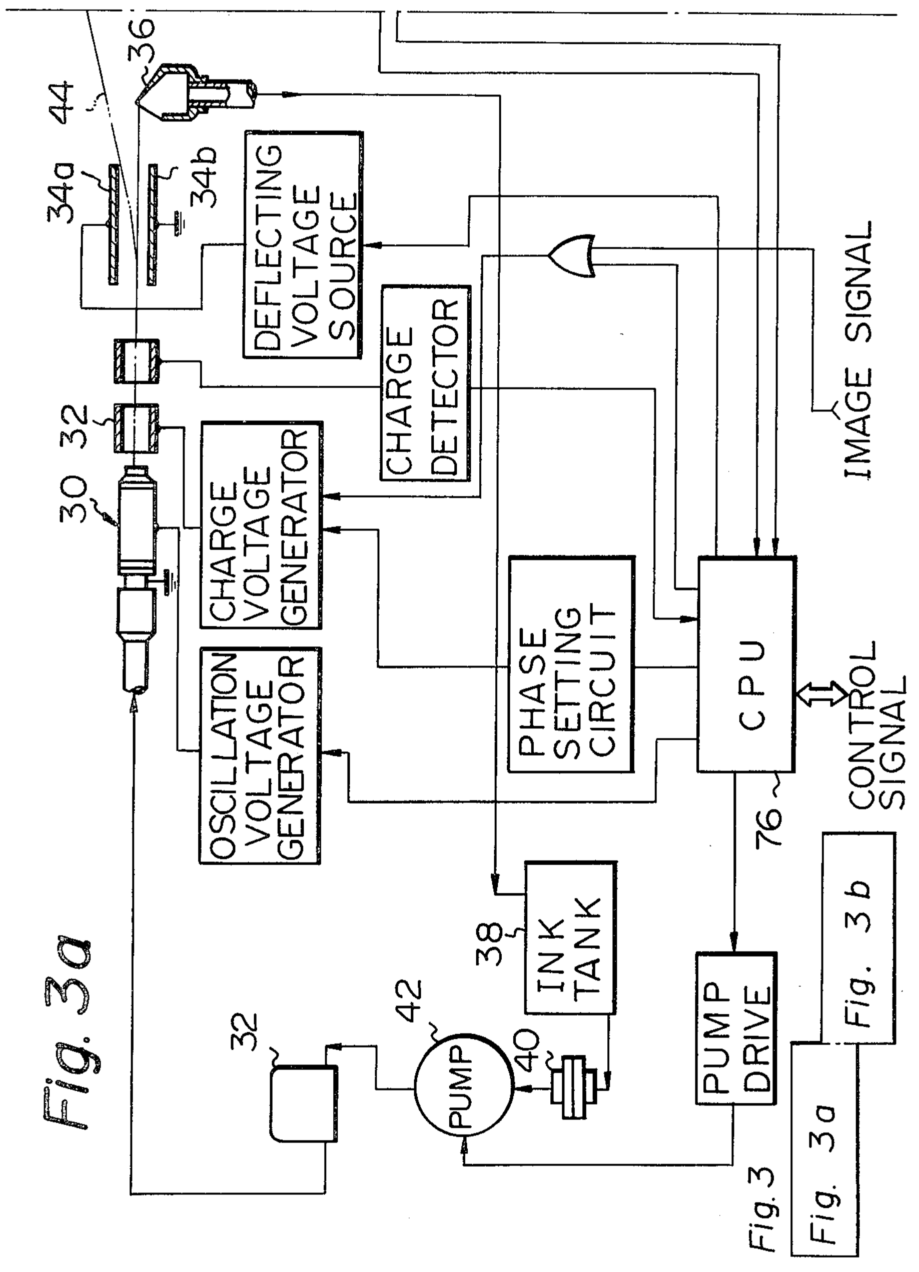
FIGS. 3*a* and 3*b* comprise FIG. 3 which is a block diagram of an ink jet printing apparatus to which the deflection detector of FIG. 1 is applied.
Figure 3B:
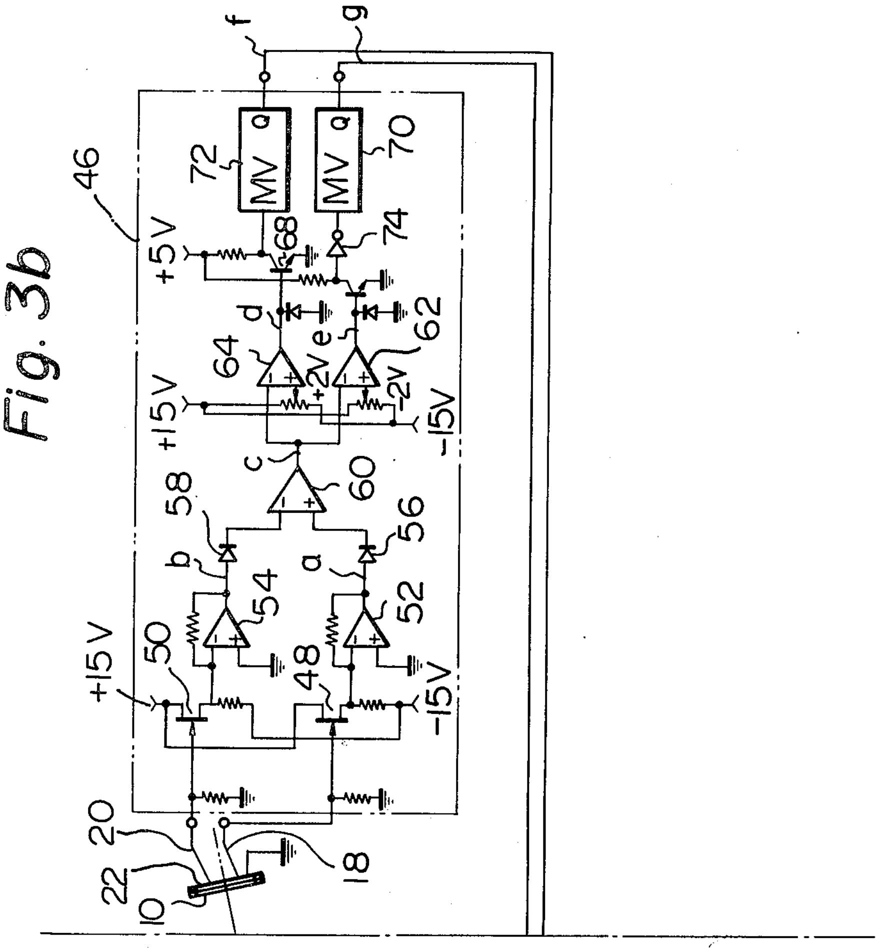

Referring to FIG. 3, an ink jet printer equipped with the deflection detector shown in FIG. 1 is illustrated. In the ink jet printer, an ink ejection head 30 is supplied with an ink under pressure from an accumulator 32. The ink is ejected from a nozzle of the head 30 under a predetermined frequency of vibration which is generated by a cylindrical electrostrictive vibrator. At a position advanced a given distance from the nozzle, the jet of ink is separated into a droplet. A charging electrode 32 is positioned to selectively charge the successively appearing ink droplets when supplied with a charging voltage. Each charged ink droplet is deflected by an electric field between cooperating deflection electrodes **34*a*–34*b* to a degree which depends on its specific amount of charge, thus impinging on a sheet of paper to form a dot thereon. Meanwhile, non-charged ink droplets are collected by a gutter 36, returned to an ink reservoir 38 and then fed to the accumulator 32 via a filter 40 by a pump 42. The deflection detector is located to a side of a specific or reference deflection path 44 when the head 30 is in its home position. A charged ink droplet passing through the aligned slots 26 and 38 of the insulator plates electrostatically induces potentials in the electrodes 18 and 20** which correspond to the actual path and amount of charge of the ink droplet.

Figure 4A:
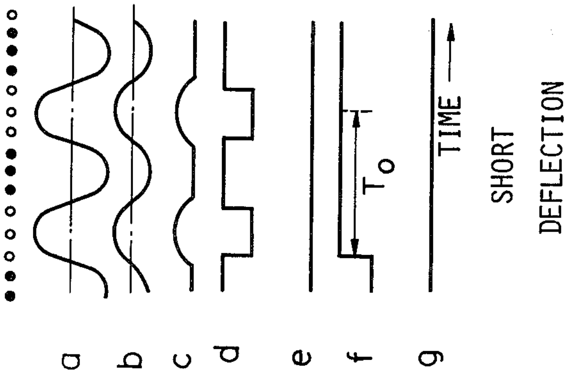
FIGS. 4*a*, 4*b* and 4*c* show waveforms of signals appearing in various portions of a deflection detection circuit indicated in FIG. 3.
Figure 4B:
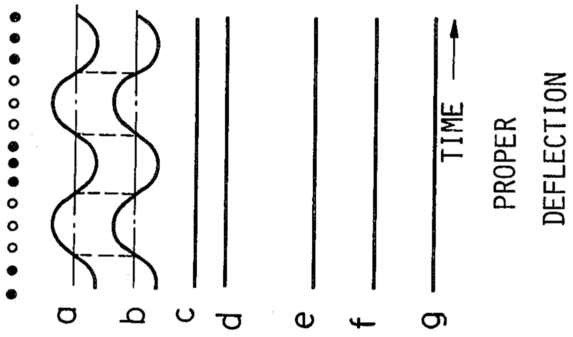
Figure 4C:
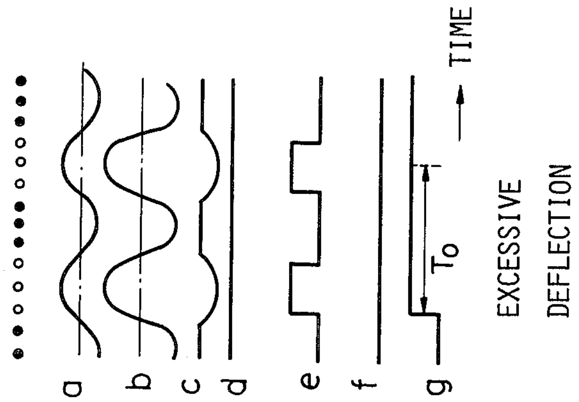

The electrodes 18 and 20 are individually connected to a deflection detection circuit 46. The potentials induced in the electrodes 18 and 20 are coupled to the bases of field effect transistors 48 and 50, respectively. The outputs of the transistors 48 and 50 are further amplified by amplifiers 52 and 54 whose outputs are in turn rectified by corresponding diodes 56 and 58 and then fed to a differential amplifier 60. The output of the differential amplifier 60 is delivered to parallel comparators 62 and 64 to be compared with a positive reference voltage and a negative reference voltage, respectively. The comparator 62 produces a ground level output when the output of the differential amplifier 60 is lower than the negative reference voltage but a positive level output when otherwise. The comparator 64, on the other hand, produces a ground level output when the output of the differential amplifier 60 is higher than the positive reference voltage but a positive level output when otherwise. The comparators 62 and 64 supplies their outputs to the bases of their associated transistors 66 and 68 each of which becomes conductive in response to a positive level input voltage. The collector of the transistor 66 cannects to a retriggerable monostable multivibrator 70 via an inverter 70, while the collector of the transistor 68 connects to a second retriggerable monostable multivibrator 72. Each of these monostable multivibrators 70 and 72 is triggered upon rise of its input from the ground level to the positive level so as to produce a high or logical "1" output (positive) for a predetermined period of time $T_0$ as shown in FIGS. 4*a*–4*c*. When retriggered before time $T_0$ expires, the monostable multivibrator holds its high or logical "1" output for a period of time $T_0$ from that instant. The output regains the ground level upon the lapse of a time $T_0$ if the monostable multivibrator has not been triggered within that period of time. The outputs of the monostable multivibrators 70 and 72 are coupled to a central control unit 76 which functions to search for a proper charging phase, sets a proper amount of deflection and controls a printing operation. Of these functions of the central control unit 76, the following description will concentrate on the detection and setting of a deflection with which the present invention is concerned.

First, the central control unit 76 supplies a charging voltage generator with a signal which indicates a charging voltage for causing ink droplets to follow the reference path 44 and lasts for a time period in which a string of three successive ink droplets are formed. Then, the output signal of the central control unit 76 changes into a signal of the non-charging or ground level which lasts for a time period in which another string of three successive ink droplets are formed. These two signals alternate with each other thereafter. The resultant charge pattern is such that three successive ink droplets are deposited with specific charges and the next three are not charged. The electrodes 18 and 20 have their potentials varied in a sinusoidal way in correspondence with such a charge pattern. The differential amplifier 60 produces an analog voltage which represents a difference in level between rectified versions of the sinusoidal potential variations.

Suppose that a string of three successive charged ink droplets are passing through between and precisely intermediate between the electrodes 18 and 20. In this situation, the voltages induced in the electrodes 18 and 20 are at a common level so that the comparator 62 produces an output e of the ground level and the comparator 64 an output d of the positive level. This controls OFF the transistor 66 and ON the transistor 68. Therefore, the monostable multivibrators 70 and 72 are not triggered due to the ground level inputs thereto. Such a relation will be seen from FIG. 4*b*. When the deflection of charged ink droplets is short, the voltage induced in the electrode 18 grows higher than that induced in the electrode 20 causing an output f of the monostable multivibrator 72 to change into the positive level. When the deflection is excessive, the voltage induced in the electrode 20 becomes higher than that induced in the electrode 18 so that an output g of the monostable multivibrator 70 changes into the positive level, as shown in FIG. 4*c*. In FIGS. 4*a*-4*c*, black dots indicate charge ink droplets and white dots noncharged ones.

Thus, as long as ink droplets are deflected along the reference path 44, both the outputs g and f of the monostable multivibrators 70 and 72 remain at the ground level. If the deflection is short causing ink droplets to fly below the reference path 44, the output g of the monostable multivibrator 70 is ground level while that f of the monostable multivibrator 72 is positive level. If the deflection is excessive causing ink droplets to fly above the reference path 44, the outputs g and f of the monostable multivibrators 70 and 72 are positive level and ground level, respectively.

The deflection is controlled based on a control of the ink pressure, ink temperature, voltage for driving the vibrator in the head, charging voltage and/or a deflecting voltage. For this purpose, various control techniques are available such as those disclosed in Japanese Patent Application nos. 53-140798/1978, 53-141836/1978, 53-163123/1978, 55-18914/1980, 55-24302/1980 and 55-24303/1980.

As shown in FIG. 3, the deflection detector shown in FIG. 1 is positioned to oppose the reference path 44 for ink droplets. It will therefore be seen that a width occupied by the deflection detector in the direction of movement of ink droplets is not more than the thickness of the detector itself (1.6 mm) and, hence, only a negligible increase (1. 6 mm) is required in the distance which ink droplets are expected to fly. This distance is far shorter than would be needed for a printer which uses a prior art deflection detector.

Figure 5A:
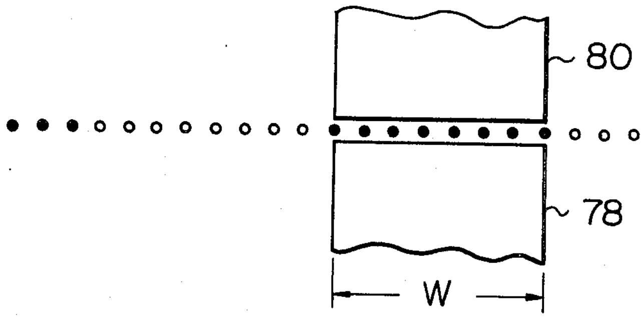
FIGS. 5*a* and 5*b* are side elevations representing a general relationship between charge detecting electrodes of the electrostatic induction type and a charge pattern of ink droplets flying therebetween.
Figure 5B:
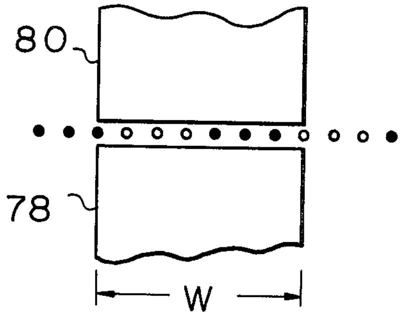

Meanwhile, let it be supposed that the electrodes 78 and 80 have a common width W as shown in FIGS. 5*a* and 5*b*. Insofar as the number of successive charged in droplets (black dots) for deflection detection is substantially larger than that which corresponds to the width W as shown in FIG. 5*a*, potentials induced in the electrodes 78 and 80 vary as sinusoidal waves as previously mentioned. However, as one period of the charge pattern decreases toward that corresponding to the width W, the fluctuation becomes progressively smaller; when one period of the charge pattern is less than the width W as viewed in FIG. 5*b*, no noticeable fluctuation appears any longer. In accordance with the present invention, the electrode thickness corresponding to the width W is that of printed electrodes (21 μm) which is very small while ink droplets fly at intervals of 100–150 μm which is far larger than the thickness of the printed electrodes. This causes the potential at each electrode 78 or 80 to fluctuate every time a charged ink droplet passes by, thereby increasing the accuracy of detection. Indeed, a deflection can be detected when the period of the charge pattern is the shortest, that is, when one charged droplet and one non-charged droplet alternated with each other. Hence, the number of ink droplets necessary for detecting a deflection can be reduced in proportion to the decrease in the period of the charge pattern. This eventually speeds up the detection since ink droplets appear at a constant period without interruption.

Figure 6A:
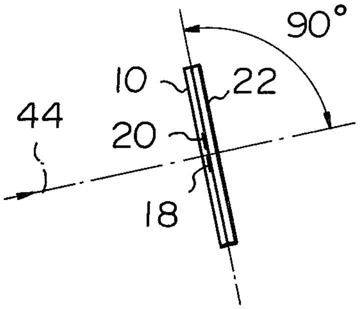
FIGS. 6*a* and 6*b* are side elevations of the deflection detector in different angular positions.
Figure 6B:
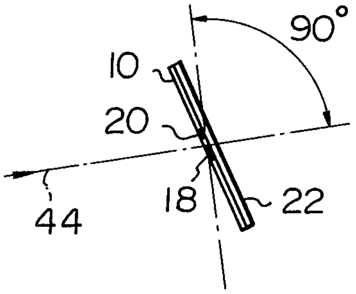
Figure 6C:
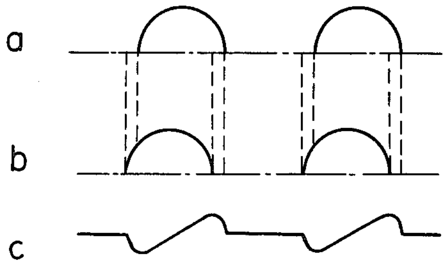
FIG. 6*c* shows a waveform indicating deflection detection signals which result from the angular position shown in FIG. 6*b.*

Hereinafter will be discussed the position of the deflection detector relative to the reference deflection path 44, supposing the use of the deflection detection circuit 46 of FIG. 3.

Where the deflection detector is positioned in such a plane that the surface of the first insulator plate 10 carrying the electrodes 18 and 20 is perpendicular to the reference path 44 as shown in FIG. 6*a*, the potentials at the electrodes 18 and 20 fluctuate in accurately timed relation as indicated in FIG. 4*b* so that a deflection can be detected exactly as shown in FIGS. 4*a*-4*c*. However, where the first insulator plate 10 is inclined relative to the plane perpendicular to the reference path 44 as seen in FIG. 6*b*, a phase difference develops between detection signals a and b as indicated FIG. 6*c* even if ink droplets accurately follow the reference path 44 (midway between the electrodes 18 and 20). Should an error signal indicating the difference between the signals a and b be of a substantial level, the circuit 46 would determine the deflection proper (g, f = logical "1") despite any short or excessive deflection with respect to the reference path 44. It will thus be seen that the deflection detector should preferably be positioned perpendicular or substantially perpendicular to the reference path 44 in order to maintain the error signal (a-b) lower in level than the reference voltages coupled to the comparators 62 and 64 while ink droplets follow the reference path 44.

Since the accuracy of detection and the time period necessary for a detection depend on the width (thickness in the present invention) W of the electrodes, it is most preferable that the electrode thickness be smaller than the interval between successive ink droplets.

In summary, it will be seen that the present invention provides a deflection detector which is accurate in operation and promotes a quick detection of a deflection position.

Various modifications will become possible for those skilled in the art after receiving the teachings of the present disclosure without departing from the scope thereof. For example, while the first and second insulator plates 10 and 22 have been shown and described as comprising sheets of glass epoxy resin to attain sufficient resistance to deformation and corrosion, they may be formed of ceramics which is also resistive to deformation.

What is claimed is:

1. A deflection detector for an ink jet printing apparatus, comprising:

a first layer of an insulating material which carries on one surface thereof at least two flat and thin separate detection electrodes, and a second layer of an insulating material which is engaged with said detection electrodes at one surface thereof, said first and second insulator layers being formed with aligned slots which extend throughout the insulator layers and the detection electrodes to allow ink droplets to pass therethrough.

2. A deflection detector as claimed in claim 1, in which each of the first and second insulator layers is provided with a shield electrode on the other surface thereof, the slot extending also through said shield electrode.

3. A deflection detector as claimed in claim 1, in which the deflection detector is positioned to have said one surface of the first insulator layer located substantially perpendicular to a reference deflection path for charged ink droplets.

4. A deflection detector as claimed in claim 1, in which each of the first and second insulator layers is constituted by a plate of glass epoxy resin.

5. A deflection detector as claimed in claim 1, in which each of the first and second insulator layers is constituted by a ceramic plate.

6. An ink jet printing apparatus comprising:

an ink ejection head for ejecting a jet of ink, charging means for electrostatically and selectively charging ink droplets successively separated from the jet of ink, deflection means for electrostatically deflecting the charged ink droplets, and deflection detector for detecting an amount of deflection of the charged ink droplets, said deflection detector having a first layer of an insulating material which carries on one surface thereof at least two flat and thin separate detection electrodes, and a second layer of an insulating material which is engaged with said detection electrodes at one surface thereof, said first and second insulator layers being formed with aligned slots which extend throughout the insulator layers and the detection electrodes to allow ink droplets to pass therethrough.

7. An apparatus as claimed in claim 6, in which each of the first and second insulator layers is formed with a shield electrode on the other surface thereof, the slot extending also through said shield electrode.

8. An apparatus as claimed in claim 6, in which the deflection detector is positioned to have said one surface of the first insulator layer located substantially perpendicular to a reference deflection path for charged ink droplets.

9. An apparatus as claimed in claim 6, in which each of the first and second insulator layers is constituted by a plate of glass epoxy resin.

10. An apparatus as claimed in claim 6, in which each of the first and second insulator layers is constituted by a ceramic plate.

* * * * *